United States Patent [19]

Chubb

[11] Patent Number: 4,626,404

[45] Date of Patent: Dec. 2, 1986

[54] ANNULAR BURNABLE ABSORBER ROD

[75] Inventor: Walston Chubb, Franklin Township, Venango County, Pa.

[73] Assignee: Westinghouse Electric Corp., Pittsburgh, Pa.

[21] Appl. No.: 563,895

[22] Filed: Dec. 21, 1983

[51] Int. Cl.$^4$ .............................................. G21C 7/04
[52] U.S. Cl. ................................... 376/447; 376/327; 376/455
[58] Field of Search ............... 376/327, 333, 339, 332, 376/412, 419, 455, 447, 421

[56] References Cited

U.S. PATENT DOCUMENTS

| | | | |
|---|---|---|---|
| 2,983,663 | 5/1961 | Bassett | 376/419 |
| 3,000,802 | 9/1961 | Worn et al. | 376/339 |
| 3,032,492 | 5/1962 | Stacy et al. | 376/421 |
| 3,042,598 | 7/1962 | Crowther | 376/419 |
| 3,103,479 | 9/1963 | Ronsohoff | 376/447 |
| 3,151,032 | 9/1964 | Deutsch et al. | 376/333 |
| 3,168,399 | 2/1965 | Takahashi et al. | 376/412 |
| 3,202,583 | 8/1965 | Salesse et al. | 376/455 |
| 3,255,092 | 6/1966 | Dee, Jr. | 376/333 |
| 3,427,222 | 2/1969 | Biancheria et al. | 376/419 |
| 3,679,545 | 7/1972 | Leirvik | 376/327 |
| 3,985,514 | 10/1976 | Miller | 376/339 |

FOREIGN PATENT DOCUMENTS 725771 1/1966 Canada ................. 376/327

OTHER PUBLICATIONS

Nuclear Science & Eng., vol. 55, p. 58, 1974, Bierman et al.
Power Reactor Technology, vol. 4, No. 4, 9/61, pp. 39–46.
Research Disclosure, 4/81, No. 204, p. 165.
"Naval Reactors Physics Handbook", vol. I ed. by Radkowsky, U.S. Gov't Printing Office (1964) pp. 800–802, 815–818.
"Reactor Handbook vol. I Materials," ed. by Tipton, Interscience Publishers, (1960) pp. 777–782.
Duderstadt et al, "Nuclear Reactor Analysis," John Wiley & Sons, (1976) pp. 551, 552.
Roberts, "Structural Materials in Nuclear Power Systems," Plenum Press, (1981) pp. 53–59, 119–124.
"Handbook of Chemistry and Physics," 50th edition, pp. B268, B286 and B537.

Primary Examiner—Harvey E. Behrend
Attorney, Agent, or Firm—John J. Prizzi

[57] ABSTRACT

An annular burnable absorber rod which minimizes the displacement of cooling water from a nuclear reactor core is disclosed. The rod is constructed from a pair of concentric tubes providing a sealed annular space therebetween. A tubular support having a layer of zirconium diboride deposited by chemical vapor deposition is located within the annular space and protected against corrosion.

7 Claims, 2 Drawing Figures

ANNULAR BURNABLE ABSORBER ROD

BACKGROUND OF THE INVENTION

The present invention relates in general to burnable absorbers, also referred to as burnable poisons, for nuclear reactors, and more particularly, to an annular burnable absorber rod for use in a nuclear reactor core of fuel assemblies and which annular burnable absorber rod is constructed to minimize the displacement of the moderator and coolant, i.e., water, flowing within the reactor core while controlling the reactivity and ultimately extending the operating life cycle of the fuel assemblies.

The process of nuclear fission involves the disintegration of fissionable nuclear fuel material into two or more fission products of lower mass number. Among other things, the process also includes a net increase in the number of available free neutrons which are the basis for a self-sustaining reaction. When a reactor has operated over a period of time, the fuel assembly with fissionable materials must ultimately be replaced due to depletion. Inasmuch as the process of replacement is time consuming, taking as much as six weeks, and costly in terms of lost power generation, it is desirable to extend the life of a given fuel assembly as long as practically feasible. For that reason, deliberate additions to the reactor fuel of parasitic neutron-capturing elements in calculated small amounts may lead to highly beneficial effects on a thermal reactor. Such neutron-capturing elements are usually designated as burnable absorbers if they have a high probability or cross-section for absorbing neutrons while producing no new or additional neutrons or changing into new absorbers as a result of neutron absorption. During reactor operation, the burnable absorbers are progressively reduced in amount so that there is a compensation mode with respect to the concomitant reduction in the fissionable material.

The life of a fuel assembly may be extended by combining an initially larger amount of fissionable material, as well as a calculated amount of burnable absorber. During the early stages of operation of such a fuel assembly, excessive neutrons are absorbed by the burnable absorber which undergoes transformation to elements of low neutron cross-section which do not substantially affect the reactivity of the fuel assembly in the latter period of its life when the availability of fissionable material is lower. The burnable absorber compensates for the larger amount of fissionable material during the early life of the fuel assembly, but progressively less absorber captures neutrons during the latter life of the fuel assembly, so that a long life at relatively constant fission level is assured for the fuel assembly. Accordingly, with a fuel assembly containing both fissionable material and burnable absorber in carefully proportioned quantities, an extended fuel assembly life can be achieved with relatively constant neutron production and reactivity. Burnable absorbers which may be used include boron, gadolinium, samarium, europium, and the like, which upon the absorption of neutrons result in isotopes of sufficiently low neutron capture cross-section so as to be substantially transparent to neutrons.

The incorporation of burnable absorbers in fuel assemblies has thus been recognized in the nuclear field as an effective means of increasing fissionable material capacity and thereby extending reactor core life, for example, to eighteen months without the requirement for fissionable material replacement. Burnable absorbers are used either uniformly mixed with the fissionable material, i.e., distributed absorber, deposited as a coating on the exterior of nuclear fuel pellets containing fissionable material as disclosed in U.S. Pat. No. 3,427,222, or are placed as separate elements in the reactor core. Thus, the net reactivity of the reactor core is maintained relatively constant over the active life of a reactor core.

Although the use of burnable absorbers as separate elements in the reactor core has been known to extend the reactor core life and operating cycle, the use of such burnable absorbers in this manner has its limitations. For example, the use of a burnable absorber as a separate element, for example, in the form of rods, require a corresponding displacement and loss of moderator and coolant within the reactor core. This loss is undesirable as the heating of the nuclear reactor forces additional coolant out of the reactor core, and unless carefully controlled, can result in the nuclear reactor operating with a Positive Moderator Coefficient. To this end, there has been known the use of a burnable absorber in the form of a hollow stainless steel clad borosilicate glass tube containing approximately thirteen percent by weight of boron oxide as the burnable absorber material. However, these borosilicate glass tubes occupy a relatively large volume and therefore displace a corresponding large volume of coolant from the reactor core. This undesirable displacement of coolant is, in part, attributable to the relatively large volume occupied by the major inactive components of the borosilicate glass as compared with the relatively small volume occupied by the burnable absorber material.

Accordingly, it can be appreciated that there is an unsolved need for a burnable absorber rod which minimizes the displacement of coolant within a reactor core while controlling the reactivity and ultimately extending the operating life cycle of the fuel assemblies, in addition, to minimizing the material costs of such burnable absorber rods, as well as simplifying their construction.

SUMMARY OF THE INVENTION

It is broadly an object of the present invention to provide an annular burnable absorber rod which overcomes or avoids one or more of the foregoing disadvantages resulting from the use of the above-mentioned prior art burnable absorbers, and which fullfills the specific requirements of such a burnable absorber rod for use generally with nuclear reactors having one or more fuel assemblies. Specifically, it is within the contemplation of one aspect of the present invention to provide an annular burnable absorber rod which controls the reactivity and extends the operating life cycle of a fuel assembly while occupying a minimum volume so as to minimize the displacement of coolant from the reactor core.

A further object of the present invention is to provide an annular burnable absorber rod which minimizes the tendency of certain nuclear reactors to operate with a Positive Moderator Coefficient.

A still further object of the present invention is to provide an annular burnable absorber rod which minimizes the material costs while facilitating its construction.

A yet still even further object of the present invention is to provide an annular burnable absorber rod which is both durable and of rigid construction for extended use.

In accordance with one embodiment of the present invention, there is provided an annular burnable poison rod for use with a nuclear reactor. The annular burnable absorber rod is constructed of a first and second tube in concentric arrangement providing an annular space therebetween, a support arranged within the annular space, and burnable absorber material provided on at least a portion of the support.

In accordance with the above embodiment of the present invention, the first and second tubes are cylindrical in construction, the support is constructed of a cylindrical tubular support substantially coextensive with the first and second cylindrical tubes, and the burnable absorber material comprises a boron containing compound provided on the outer surface of the tubular support, and optionally on the inner surface as well.

Still further in accordance with the above embodiment of the present invention, the boron containing compound comprises zirconium diboride provided on the outer surface of the tubular support by chemical vapor deposition having a thickness in the range of from 0.002 to 0.010 inches.

BRIEF DESCRIPTION OF THE DRAWINGS

The above description, as well as further objects, features and advantages of the present invention, will be more fully understood by reference to the following detailed description of a presently preferred but nonetheless illustrative, annular burnable absorber rod in accordance with the present invention, when taken in conjunction with the accompanying drawings, wherein.

DETAILED DESCRIPTION

Figure 1:
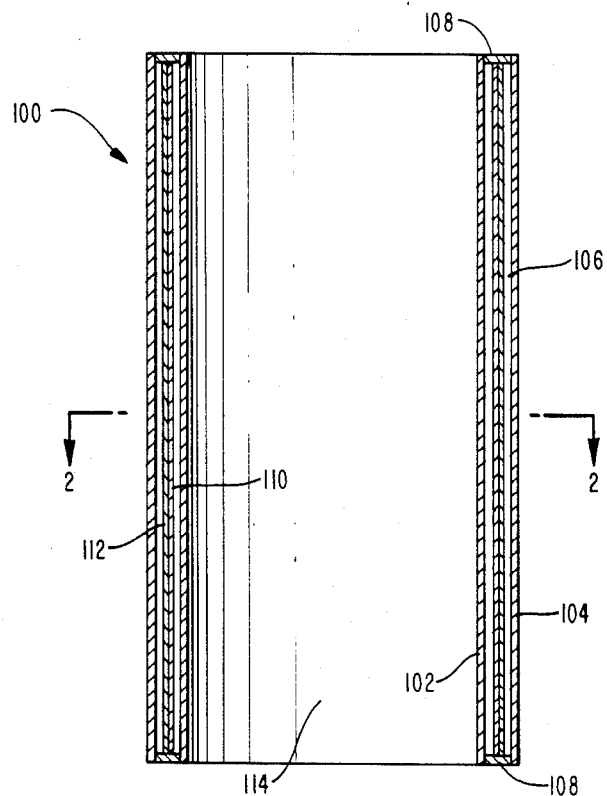
FIG. 1 is a cross-sectional view of an annular burnable absorber rod in accordance with the present invention constructed of a first and second cylindrical tube in concentric arrangement providing an annular space therebetween and a cylindrical tubular support arranged within the annular space having a layer of burnable absorber material deposited over a portion thereof.
Figure 2:
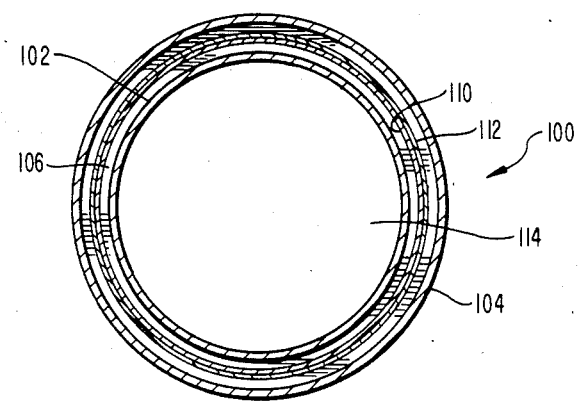
FIG. 2 is a cross-sectional view of the annular burnable absorber rod taken along Line 2—2 of FIG. 1.

Referring generally to the drawings in which like reference numerals represent like elements, there is shown in FIG. 1 a cross-sectional view of a portion of an annular burnable absorber rod generally designated by reference numeral 100 and adapted for use in a nuclear reactor. The rod 100 is constructed of a pair of metal cylindrical hollow tubes 102, 104 in concentric arrangement providing an annular space 106 therebetween. The annular space 106, at the opposite terminal ends of the tubes 102, 104, is hermetically sealed by an annular plug 108. Positioned within the annular space 106, and substantially coextensive with the tubes 102, 104, is a metal cylindrical tubular support 110. Burnable absorber material 112 is deposited over the outer surface of the tubular support 110 as to be described hereinafter. However, the burnable absorber material 112 can also be deposited over the inside surface of the tubular support 110.

In accordance with one embodiment of the present invention, the tubular support 110 is constructed of a niobium metal sheet having a thickness in the range of from 0.0005 to 0.002 inches, and preferably a thickness of 0.001 inches. The niobium metal sheet is rolled into a cylindrical hollow tube having a diameter of from about 0.25 to 0.40 inches, and preferably a diameter of 0.33 inches, which tube is spot welded to hold its tubular shape. The length of the tubular support 110 is generally in the range of from one to five feet, from which longer or shorter lengths may be assembled. The tubes 102, 104 are constructed from a rigid tube of zirconium or stainless steel material having a thickness in the order of, for example, 0.030 inches and a length of from eight to fifteen feet. The outside diameter of the inner tube 102 is slightly smaller than the inside diameter of the tubular support 110, while the inside diameter of the outer tube 104 is slightly greater than the outside diameter of the tubular support. In this manner, the concentric arrangement of the tubes 102, 104 provides the annular space 106 which can receive the tubular support 110 and the deposited layer of burnable absorber material 112. The burnable absorber material 112 is protected from corrosion by being hermetically sealed within the annular space 106 by the annular plugs 108, so as to prevent entry of the reactor coolant flowing through the longitudinally extending opening 114 and around the outside of the rod 100.

The burnable absorber material 112 is a deposited layer of, for example, a boron containing compound such as boron, boron carbide, boron nitride, and preferably zirconium diboride. A number of different methods have been successfully employed for applying coatings of a predetermined thickness of zironium diboride to an underlying metal substrate. These application methods include chemical vapor deposition, sputtering, flame spraying, plasma-jet spraying, and electrodeposition from salts. Chemical vapor deposition (CVD) is the preferred method of applying a layer of zirconium diboride as such method is a relatively fast coating process when compared with other techniques such as sputtering, and does not coat in line of sight. For example, a 0.002 to 0.010 inch layer of zirconium diboride can be readily deposited on a niobium tubular support 110 by CVD at temperatures in the range of about 800° to 825° C.

The formation of zirconium diboride is accomplished by the reaction between boron trichloride and zirconium tetrachloride in a hydrogen stream at elevated temperatures. Gaseous zirconium tetrachloride is prepared by reacting hydrogen chloride and zirconium, and carrying the reaction products in a hydrogen stream. The reactants should have a 99.9 percent minimum purity while the non-reactant carrier gas should have a 99.98 percent minimum purity. The carrier gas can be hydrogen or any of the Group VIII elemental gases, such as helium, argon, neon, krypton, or xenon, or any combination of the same. One purpose of the carrier gas is to reduce the partial pressure of oxygen in the reactor chamber of a furnace to prevent the formation of water during the CVD process. The CVD process can be carried out in a variety of equipment suitable for such process. For example, either a molyledenum round furnace, a quartz furnace, a stainless steel furnace, or the like, wherein the furnace is a hot wall system having the capability of maintaining temperature stabilization, may be employed. Additionally, the CVD process is carried out at atomspheric pressure eliminating the need for a high vacuum chamber as required for ionplating or sputtering. As CVD does not coat in line of sight, a layer of zirconium diboride may be deposited over the entire outer or inner surface of the tubular support 110 to achieve a total surface coating during one operation.

Satifactory coatings of zirconium diboride on a layer of niobium were obtained under various conditions as summarized in Table I as follows:

TABLE I

SUMMARY OF CONDITIONS FOR DEPOSITING A LAYER OF $ZrB_2$

| Run Time (min) | Temp. (°C.) | Flows (Mole Percent) | | | | Total Flow (cc/min) |
| --- | --- | --- | --- | --- | --- | --- |
| | | $BCl_3$ | HCl | $H_2$ | $ZrCl_4$ | |
| 60 | 800 | 0.140 | 0.053 | 99.680 | 0.128 | 17098 |
| 37 | 805 | 0.279 | 0.204 | 99.298 | 0.220 | 17196 |
| 76 | 800 | 0.187 | 0.234 | 99.498 | 0.082 | 17114 |
| 30 | 805 | 0.279 | 0.204 | 99.298 | 0.220 | 17196 |
| 25 | 805 | 0.279 | 0.204 | 99.298 | 0.220 | 17196 |
| 27 | 804 | 0.279 | 0.204 | 99.298 | 0.220 | 17196 |
| 75 | 825 | 0.140 | 0.234 | 99.544 | 0.082 | 17106 |
| 37 | 803 | 0.279 | 0.204 | 99.298 | 0.220 | 17196 |
| 55 | 817 | 0.140 | 0.234 | 99.543 | 0.082 | 17106 |
| 37 | 810 | 0.279 | 0.204 | 99.298 | 0.220 | 17196 |
| 55 | 809 | 0.140 | 0.105 | 99.640 | 0.114 | 17101 |

In accordance with the present invention, there has thus far been described an annular burnable absorber rod constructed of a first and second cylindrical tube in concentric arrangement providing an annular space therebetween. A cylindrical tubular support is arranged within the annular space and a layer of zirconium diboride is deposited over a portion of the surface of the support. The annular space is hermetically sealed at the terminal ends of the tubes to prevent corrosion of the zirconium diboride layer, which layer may be deposited by a variety of techniques, and preferrably by chemical vapor deposition. The annular burnable absorber rod, in accordance with the present invention, may be constructed of various lengths and diameters to meet the requirements of a particular nuclear reactor, e.g., eleven feet in length. Thus, the annular burnable absorber rod of the present invention is constructed to occupy a minimum volume so as to displace a minimum quantity of coolant from a reactor core which thereby improves the operating characteristics of the reactor and eliminates the potential of such operation having a Positive Moderator Coefficient.

Although the invention herein has been described with reference to particular embodiments, it is to be understood that these embodiments are merely illustrative of the principles and applications of the present invention. It is therefore to be understood that numerous modifications may be made in the illustrative embodiments and that other arrangements may be devised without departing from the spirit and scope of the present invention as defined by the appended claims.

What is claimed is:

1. In a neutron irradiation environment of a water cooled and moderated reactor core a fuel assembly having a discrete annular burnable absorber rod, said rod being free of nuclear fuel material said rod comprising a first elongated hollow tube having opposed ends, a second elongated hollow tube having opposed ends, said first and second tubes constructed of a zirconium material, said first and second tubes concentrically arranged about a common axis to provide a coextensive annular space therebetween and a path for said water through said first tube along said common axis, sealing means for sealing said annular space at common opposed ends of said first and second tube, a hollow niobium tubular support arranged within said annular space, said tubular support having an inner and outer surface, a layer of burnable neutron absorber material provided on at least a portion of one of said surfaces of said support said layer of said burnable neutron absorber material selected from the group of boron compounds consisting of boron carbide, boron nitride and zirconium diboride;

and said layer of said burnable neutron absorber material having a thickness between 0.002 to 0.010 inches.

2. The annular burnable absorber rod of claim 1 wherein said first and second tubes are cylindrical in shape.

3. The annular burnable absorber rod of claim 1 wherein said burnable absorber material is provided on the outer surface of said tubular support.

4. The annular burnable absorber rod of claim 1 wherein said burnable absorber material is provided on the inner surface of said tubular support.

5. The annular burnable absorber rod of claim 1 wherein said annular space is hermetically sealed by said sealing means.

6. The annular burnable absorber rod of claim 1 wherein said burnable neutron absorber material comprises zirconium diboride.

7. The annular burnable absorber rod of claim 1 wherein the cross-sectional dimension of said annular space is greater than the cross-sectional dimension of said tubular support and said layer of burnable neutron absorber material provided thereon to provide a space therebetween.

* * * * *